United States Patent [19]
Colbow et al.

[11] Patent Number: 6,153,323
[45] Date of Patent: Nov. 28, 2000

[54] ELECTRODE TREATMENT METHOD FOR IMPROVING PERFORMANCE IN LIQUID FEED FUEL CELLS

[75] Inventors: Kevin M. Colbow, North Vancouver; Jiujun Zhang, Richmond; David P. Wilkinson, North Vancouver, all of Canada

[73] Assignee: Ballard Power Systems Inc., Burnaby, Canada

[21] Appl. No.: 09/173,845

[22] Filed: Oct. 16, 1998

[51] Int. Cl.[7] ........................................ H01M 8/00
[52] U.S. Cl. .................. 429/12; 429/13; 429/14; 429/40; 429/42; 429/44; 429/30
[58] Field of Search .................. 429/12, 14, 30, 429/40, 44, 13, 42

[56] References Cited

U.S. PATENT DOCUMENTS

| | | | |
|---|---|---|---|
| 4,876,115 | 10/1989 | Raistrick | 427/115 |
| 5,084,144 | 1/1992 | Reddy et al. | 205/104 |
| 5,271,917 | 12/1993 | Hoffman | 429/44 |
| 5,292,600 | 3/1994 | Kaufman | 429/40 |
| 5,523,177 | 6/1996 | Kosek et al. | 429/40 |
| 5,599,638 | 2/1997 | Surampudi et al. | 429/33 |
| 5,672,439 | 9/1997 | Wilkinson et al. | 429/40 |

FOREIGN PATENT DOCUMENTS

| | | |
|---|---|---|
| 2-049356 | 2/1990 | Japan . |
| 4-206153 | 7/1992 | Japan . |

OTHER PUBLICATIONS

Kinoshita, "Carbon Electrochemical and Physicochemical Properties," John Wiley & Sons, Inc., New York, U.S.A., pp. 86–88 (1988) no month available.

McCreery, *Electroanalytical Chemistry*, edited by A.J. Bard, Marcel Dekker, Inc., New York, pp. 258–267 (1991) no month available.

Pu, et al., "A Methanol Impermeable Proton Conducting Composite Electrolyte System," *J. Electrochem. Soc.*, 142(7):L119–L120 (Jul., 1995).

*Primary Examiner*—Bruce F. Bell
*Attorney, Agent, or Firm*—McAndrews, Held & Malloy, Ltd.

[57] ABSTRACT

Fuel cell performance in liquid feed fuel cells with an electrode comprising a carbonaceous substrate and an electrocatalyst can be increased by oxidizing the carbon substrate, particularly by electrochemical methods in acidic aqueous solution, prior to incorporation of the electrocatalyst. The treated substrate may thereafter be advantageously impregnated with a proton conducting ionomer to prevent excessive penetration of the applied catalyst into the substrate. The treatment method is particularly effective for direct methanol fuel cell anodes.

25 Claims, 6 Drawing Sheets

ELECTRODE TREATMENT METHOD FOR IMPROVING PERFORMANCE IN LIQUID FEED FUEL CELLS

FIELD OF THE INVENTION

The present invention relates to electrochemical cells, and in particular to an electrode treatment method for improving performance in a liquid feed fuel cell. More particularly, the present invention relates to electrochemical anode treatment for improving performance in direct methanol fuel cells (DMFCs).

BACKGROUND OF THE INVENTION

Electrochemical fuel cells convert reactants, namely fuel and oxidant fluid streams, to generate electric power and reaction products. Electrochemical fuel cells generally employ an electrolyte disposed between two electrodes, namely a cathode and an anode. An electrocatalyst typically induces the desired electrochemical reactions at the electrodes. In addition to electrocatalyst, the electrodes may also comprise a porous electrically conductive sheet material, or electrode substrate, upon which the electrocatalyst is deposited. The electrocatalyst may be a metal black, an alloy or a supported metal catalyst such as, for example, platinum on carbon.

A particularly attractive fuel cell is the solid polymer electrolyte fuel cell, which employs a membrane electrode assembly ("MEA"). The MEA comprises a solid polymer electrolyte or ion-exchange membrane disposed between the two electrode layers. Flow field plates for directing the reactants across one surface of each electrode substrate, are disposed on each side of the MEA.

Electrocatalyst can be incorporated at the electrode/electrolyte interfaces in solid polymer fuel cells by applying it in a layer on either an electrode substrate or on the membrane electrolyte itself. In the former case of the, electrocatalyst particles are typically mixed with a liquid to form a slurry or ink which is then applied to the electrode substrate. While the slurry preferably wets the substrate surface to an extent, it is preferred that the slurry not penetrate too deeply into the substrate so that as much of the catalyst as possible will be located at the desired membrane electrolyte interface.

Effective electrocatalyst sites have several desirable characteristics: (1) the sites are accessible to the reactant, (2) the sites are electrically connected to the fuel cell current collectors, and (3) the sites are ionically connected to the fuel cell electrolyte. Electrons and protons are typically generated at the anode electrocatalyst. The electrically conductive anode is connected to an external electric circuit, which conducts an electric current. The electrolyte is typically a proton conductor, and protons generated at the anode electrocatalyst migrate through the electrolyte to the cathode. Electrocatalyst sites are not productively utilized if the protons do not have a means for being ionically transported to the electrolyte. Accordingly, coating the exterior surfaces of the electrocatalyst particles with ionically conductive ionomer coatings has been employed to increase the utilization of electrocatalyst exterior surface area and to increase fuel cell performance by providing improved ion-conducting paths between the electrocatalyst surface sites and the electrolyte. The ionomer can be incorporated in the catalyst ink or can be applied to the substrate after it has been coated with catalyst.

A measure of electrochemical fuel cell performance is the voltage output from the cell for a given current density. Higher performance is associated with a higher voltage output for a given current density or higher current density for a given voltage output. Increasing effective utilization of the electrocatalyst enables the same amount of electrocatalyst to induce a higher rate of electrochemical conversion in a fuel cell, thereby resulting in improved performance.

A broad range of reactants can be used in electrochemical fuel cells and such reactants may be delivered in gaseous or liquid streams. For example, the fuel stream may be substantially pure hydrogen gas, a gaseous hydrogen-containing reformate stream, or aqueous methanol in a direct methanol fuel cell (DMFC). The oxidant may, for example, be substantially pure oxygen or a dilute oxygen stream such as air.

Solid polymer fuel cells that operate on liquid reactant streams ("liquid feed fuel cells") have somewhat different requirements than those operating on gaseous reactant streams. In particular, the requirements for effectively distributing a liquid reactant stream and making reactant contact with the electrocatalyst layer are different than for a gas stream. For instance, hydrophobic components such as PTFE are typically employed in gaseous feed fuel cells, in part, to render electrodes less wettable and to prevent "flooding". (Flooding generally refers to a situation where the pores in an electrode are so full of liquid, e.g. reaction product water, that the flow of the gaseous reactant through the electrode becomes impeded.) In liquid feed fuel cells, however, it can be desirable to make components in the anode (e.g. catalyst layer) more wettable by the liquid fuel stream in order to improve access of the reactant to the electrocatalyst sites.

In early DMFCs, sulfuric acid was incorporated in the liquid methanol fuel stream in order to enhance proton conduction at the anode. The presence of sulfuric acid however may limit the performance of the fuel cell in other ways and impose constraints on the fuel cell hardware for corrosion reasons. Acid electrolyte additives are no longer considered necessary to obtain reasonable performance from a DMFC. Instead, ionomeric coatings of the anode in the vicinity of the catalyst layer can provide for satisfactory proton conduction. Such an ionomeric coating may also improve wetting and hence access of the aqueous methanol fuel.

While it may seem desirable generally to improve the wetting of a DMFC anode, treatments that improve wetting of the anode per se, do not necessarily result in a net performance improvement. For instance, an ionomer coating also can act as a barrier to the transport of electrons, liquid fuel, and reaction product gases (e.g. carbon dioxide from methanol oxidation) thereby reducing net performance of fuel cells. Thus, the net effect of such treatments is difficult to predict.

SUMMARY OF THE INVENTION

In liquid feed solid polymer electrolyte fuel cells that include at least one electrode comprising a carbonaceous substrate, the fuel cell performance may be improved by oxidizing the carbonaceous substrate prior to incorporating electrocatalyst into the electrode. By performing the oxidative treatment prior to incorporation of the electrocatalyst, oxidation methods can be used that might otherwise damage the electrocatalyst.

Oxidation results in the formation of various surface oxide groups on the carbonaceous substrate. While different methods can be used to perform the oxidation, the type and amount of surface oxide groups may vary with the method employed. The extent of the improvement may thus also be expected to vary somewhat with the method employed.

Electrochemical oxidation in an aqueous solution is a preferred method for oxidizing the carbonaceous substrate surface and for improving fuel cell performance. Preferably, the aqueous solution is acidic. However, such treatment can make the carbonaceous substrate significantly more wettable to various species, including water. While this may be fundamentally beneficial to liquid feed fuel cell performance, it can create a problem with regards to applying electrocatalyst to the substrate afterwards. For instance, electrocatalyst applied in the form of an aqueous ink may penetrate deeply into the substrate instead of remaining in a surface layer thereon. In such an instance, the treated carbonaceous substrate can be impregnated with a proton conducting ionomer before applying the electrocatalyst thereto such that the surface of the substrate is less wettable by water.

Oxidative treatment may be expected to improve the performance of any liquid feed electrode that employs a carbonaceous substrate (i.e. cathode or anode). Generally however, the liquid reactant streams in use at this time are primarily fuels, including alcohols, ethers, and the like. The oxidative treatment is particularly suitable for use in the anodes of methanol feed DMFCs since it can provide a substantial improvement in performance. Further, the presently preferred catalyst for use in DMFC anodes is a Pt—Ru alloy that can decompose if subjected to the preferred electrochemical oxidation treatment. By treating the anode substrate before the electrocatalyst is applied, decomposition of the Pt—Ru is avoided.

In a preferred embodiment, electrochemical oxidative treatment can be carried out by constructing a simple electrochemical cell comprising the carbonaceous electrode substrate as a working electrode along with a suitable inert counter electrode. The working and counter electrodes are immersed in an aqueous solution electrolyte, preferably an acidic electrolyte, and are connected to the positive and negative terminals of a power supply, respectively. Treatment is accomplished by directing electric current through the electrochemical treatment cell. During the treatment, the voltage of the carbonaceous substrate working electrode is preferably greater than 1.2 V versus a Normal Hydrogen Electrode. Otherwise, current can pass through the electrochemical cell without resulting in significant oxidation of the substrate. Such treatment has been shown to be effective when greater than about 20 coulombs per $cm^2$ of substrate is passed through an electrochemical treatment cell.

In principle, a variety of species in differing concentrations can be employed in the electrolyte of the electrochemical treatment cell. For example, the aqueous electrolyte solution can comprise sulfuric acid in a concentration of approximately 0.5 M. The oxidative treatment has been shown to be particularly effective for electrode substrates of carbon fibre paper or carbon fibre non-woven.

After treatment, the carbonaceous substrate is desirably impregnated with a proton conducting ionomer before application of the electrocatalyst. A preferred ionomer is poly (perfluorosulphonic acid). The amount impregnated into the substrate is desirably greater than about 0.2 $mg/cm^2$. The electrocatalyst can then be subsequently applied in the form of an aqueous ink without penetrating unacceptably into the treated substrate.

Independent of any oxidative treatment of the electrode substrate, it has been discovered that a fuel cell performance improvement can be obtained simply by impregnating the substrate with a proton conducting ionomer before application of the electrocatalyst. Then, after the electrocatalyst has been applied, it may be additionally advantageous to apply ionomer again.

DETAILED DESCRIPTION OF THE PREFERRED EMBODIMENTS

Figure 1:
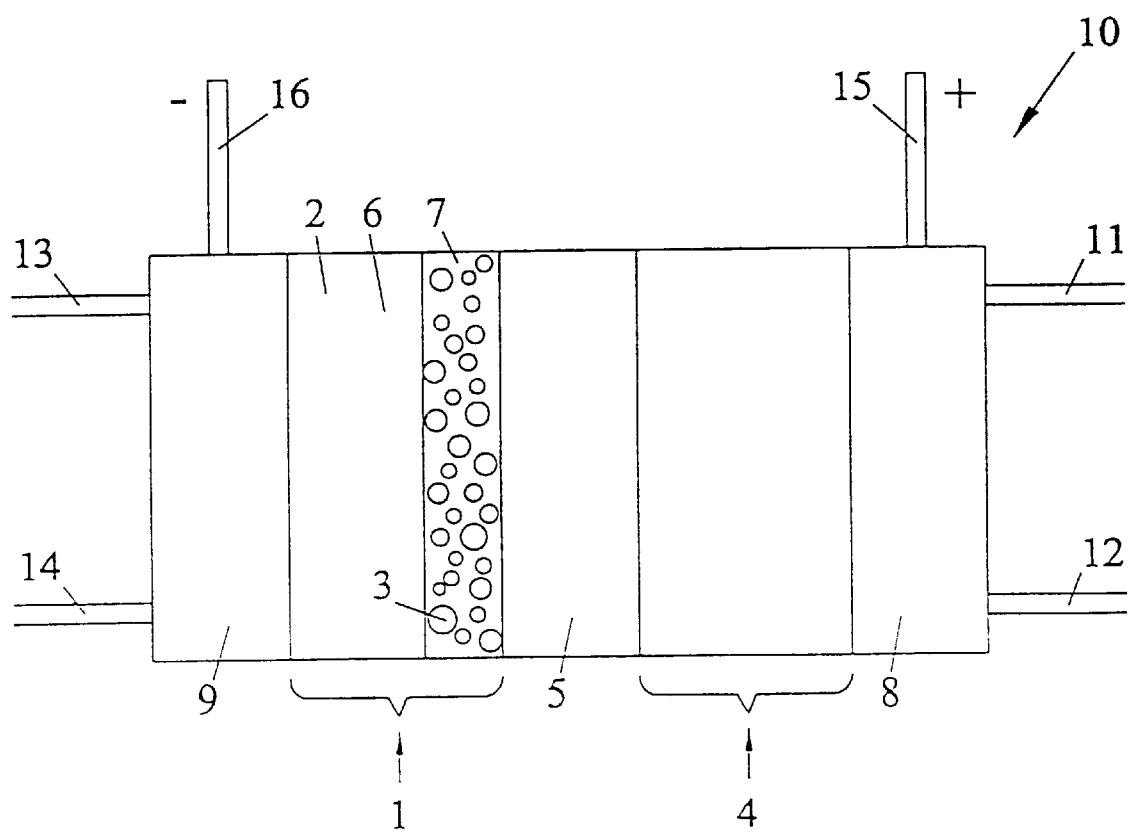
FIG. 1 is a schematic diagram of a liquid feed solid polymer electrolyte fuel cell.

In the present method, the performance of porous anodes incorporating carbonaceous substrates in liquid feed fuel cells may be improved by oxidatively treating the anode substrate, in the absence of an electrocatalyst. Thus, the present method permits the employment of oxidative treatments that might otherwise damage an electrocatalyst. A preferred oxidative treatment involves electrochemical treatment of the surface of the carbonaceous substrate in an aqueous solution. Such treatment is used to introduce acidic surface oxide groups on the carbon surface.

Various carbon containing substrates may advantageously be subjected to oxidative treatment, for example, carbon fibre based sheets and composite materials including particulate carbon. Preferred porous carbonaceous substrates include carbon fibre papers, carbon cloths, and carbon fibre non-woven materials.

Any suitable catalyst can be considered for use herein. For example, noble metal blacks, supported metal catalyst and metal alloys are commonly used. The choice of electrocatalyst for subsequent incorporation into the electrode will depend on the fuel cell reaction. For direct methanol fuel cells, presently preferred anode catalysts are alloys of platinum and ruthenium.

Electrochemical oxidation of the substrate can be performed in a simple electrochemical cell comprising a working carbonaceous substrate electrode and a suitable counter electrode which are both immersed in an aqueous solution. Although neutral or even basic solutions may be considered in principle, preferably an acidic aqueous solution is employed. The working and counter electrodes are connected to positive and negative terminals of a power supply, respectively, and electric current is passed through the electrochemical cell. In order to effect a more uniform oxidation, both electrodes are desirably of uniform geometry and spacing. The voltage of the carbonaceous substrate at the working electrode is preferably such that the following reaction occurs:

$$2H_2O \rightarrow O_2 + 4H^+ + 4e^-$$

The above reaction is somewhat dependent on the $H^+$ concentration according to the Nernst equation. Accordingly, the voltage of the carbonaceous substrate electrode is preferably greater than about 1.2 V versus the Normal Hydrogen Electrode ("NHE") in an acidic aqueous solution. Evenly distributed bubbling across the surface of both electrodes at such potentials can be used as a visual indication of uniform current distribution. It should be noted, however, that this voltage is high enough to result in dissolution of ruthenium if present on the substrate (occurring above about 1 V versus NHE). Thus, it is not desirable to have ruthenium-containing catalysts present when performing electrochemical oxidation under these conditions.

Various acids may be used in an acidic aqueous solution for the electrochemical cell. Sulfuric acid and phosphoric acid are good choices as they are stable at the desired potentials. Nitric acid and hydrochloric acid are less preferred choices as they may result in the formation of possible poisonous by-products. The type of acid and the acid concentration may be varied to produce the desired degree of substrate oxidation. Acid concentrations on the order of 0.5 M have been found to be suitable.

In simple electrochemical cells, it has been found that a carbonaceous substrate can be effectively treated by passing the order of 20 to 80 coulombs of charge per square centimeter of substrate. This can be accomplished in about 5 to 10 minutes at cell voltages around 4 V. Although both the working and counter electrode potential vary with respect to NHE, operating the cell at such voltages is usually sufficient to bring the carbonaceous working electrode above the desired 1.2 V level versus NHE. For greater certainty however, a reference electrode may be employed.

In large scale manufacture, it is generally desirable to accomplish the oxidation rapidly. Thus, increasing the area treated and/or increasing the current density might be desirable. For high volume manufacture, it may be preferable to employ flexible substrates suitable for a reel-to-reel type treatment process.

After removing residual acid from the treated substrate (e.g. by washing in water), an electrocatalyst may be applied to the substrate if so desired. Various conventional methods of applying catalyst are known such as, for example, spraying, screen printing, or ink-jet printing a slurry thereon, and electrochemical deposition. The carbonaceous substrate tends to be substantially more wettable as a result of oxidative treatment. For instance, whereas prior to treatment water droplets introduced on the substrate surface might bead and remain in place for some time, after oxidative treatment the water droplets tend to become rapidly and/or completely absorbed into the substrate. Thus, a catalyst slurry tends to penetrate more deeply into the oxidized substrate surface when applied by any of the conventional methods mentioned above (or any other technique so affected by the increased substrate wettability). If so, some of the catalyst may not remain at the substrate/membrane interface in the MEA where it is preferably located. For this and perhaps other reasons, there may be no net performance benefit in a fuel cell where the anodes were made simply by conventionally applying aqueous catalyst slurry to a wettable oxidatively treated carbonaceous substrate.

However, it has been found that impregnating carbonaceous substrates, which have been oxidatively treated before the application of an electrocatalyst, with a proton conducting ionomer coating can provide for a net benefit in fuel cell performance. Such impregnation decreases the penetration of an aqueous catalyst slurry applied to the substrate surface. Further, such impregnation can result in a fuel cell performance benefit independently of oxidative substrate treatment.

The substrate may be impregnated, for example, by dipping it for a few minutes in a solution comprising the ionomer and then drying off the carrier solvent. Preferred ionomers include DuPont's Nafion∩ ionomer in various equivalent weights (e.g. 1100 and 900 equivalent weight) and Ballard Power Systems Inc.'s BAM™ trifluorostyrene-based ionomer compositions. An ionomer coating of about 0.2 to 0.3 mg/cm$^2$ of substrate has been shown to be effective. However, greater amounts may provide improved fuel cell performance. The ionomer weight per unit area incorporated into the substrate by this dipping method depends primarily on the concentration of the ionomer in solution. For instance, a 1% Nafion™ polymer solution in isopropanol was used to introduce 0.2 to 0.3 mg/cm$^2$ of Nafion™ into a carbon fibre paper substrate. Greater amounts may be incorporated using either a more concentrated solution or via multiple dipping/drying steps.

After applying the catalyst to the substrate, a liquid feed fuel cell comprising the above anode may be constructed using conventional techniques. FIG. 1 shows a schematically typical fuel cell assembly containing a porous anode 1 comprising a carbonaceous substrate 2 that has been subjected to oxidative treatment before the application of catalyst 3. Fuel cell assembly 10 contains at least one membrane electrode assembly (MEA) comprising a porous cathode 4 and porous anode 1 that are bonded to a solid polymer membrane electrolyte 5. Electrocatalyst 3 is disposed at the interface between carbonaceous substrate 2 and membrane electrolyte 5. Ionomer 6 is dispersed over the substrate surface as a result of the aforementioned impregnation. Ionomer 7 also is preferably dispersed over the applied electrocatalyst 3 for example as a result of applying in the form of an ionomer ink solution. (The catalyst layer on the cathode is not shown.) Oxidant flow field 8 and liquid fuel flow field 9 are pressed against cathode 4 and anode substrate 2 respectively on the faces opposite the membrane electrolyte 5. Fuel cell assembly 10 has an oxidant inlet 11, an oxidant outlet 12, a liquid fuel inlet 13, and a liquid fuel outlet 14. Electrical power is obtained from the fuel cell by electrically connecting positive and negative terminals 15 and 16, respectively. The presence of acidic surface oxide groups on the carbonaceous substrate does not introduce a corrosion concern with regards to the fuel cell hardware.

Without being bound by a particular theory, the performance improvements associated with the treatment of the carbonaceous substrate may be related to an increase in the wettability of the carbonaceous substrate with either ionomer which is subsequently deposited on the electrode or the liquid reactant stream (or both). Qualitatively, the former could result in more intimate contact of an ionomer coating with the electrocatalyst thereby improving proton access/conduction. The latter could result in improving liquid reactant stream access to the catalyst. Alternatively, the presence of surface acidic groups on the substrate surface itself may improve proton access/conduction directly. Further still, the presence of surface active acidic groups may affect the reaction kinetics at the electrocatalyst sites. For instance, in a DMFC the presence of these groups may reduce the activation energy for electron transfer from methanol and/or its intermediates to the electrocatalyst, thereby improving methanol oxidation kinetics.

The following examples have been included to illustrate different embodiments and aspects of the invention, but should not be construed as limiting in any way.

EXAMPLE 1

A series of five fuel cell anodes was prepared to evaluate the effect of electrochemically oxidizing the anode substrate in laboratory test cells. In all cases, a 1.5 $cm^2$ piece of graphite carbon fibre paper, CFP090 (product of Toray), was used as the anode substrate. One test substrate was left untreated for comparative purposes. The other substrates in the series were electrochemically oxidized in a beaker cell containing 0.5 M $H_2SO_4$ and a graphite counter electrode. The treatment involved electrochemically oxidizing the test substrates at a substantial constant current of 1 A and a cell voltage of about 4 V for varying lengths of time (1, 4, 10, and 10 minutes for the four treated substrates respectively).

The test anode substrates were removed from the beaker cell after oxidative treatment and were then rinsed in water and dried. About 4 $mg/cm^2$ of catalyst was then manually applied with a spatula to the surface of each test anode substrate using an aqueous catalyst ink comprising a commercial Pt—Ru (1:1 atomic ratio) alloy catalyst from Johnson-Matthey. During application of the catalyst, the treated substrates were noticeably more wettable to the eye. Thereafter, Nafion™ ionomer was applied in a 1% propanol solution to produce a coating of about 0.3 $mg/cm^2$.

One of the substrates which was treated for ten minutes was then electrochemically treated again for another 10 minutes. However, the solution turned yellow indicating that significant dissolution of Ru from the catalyst had occurred.

Figure 2:
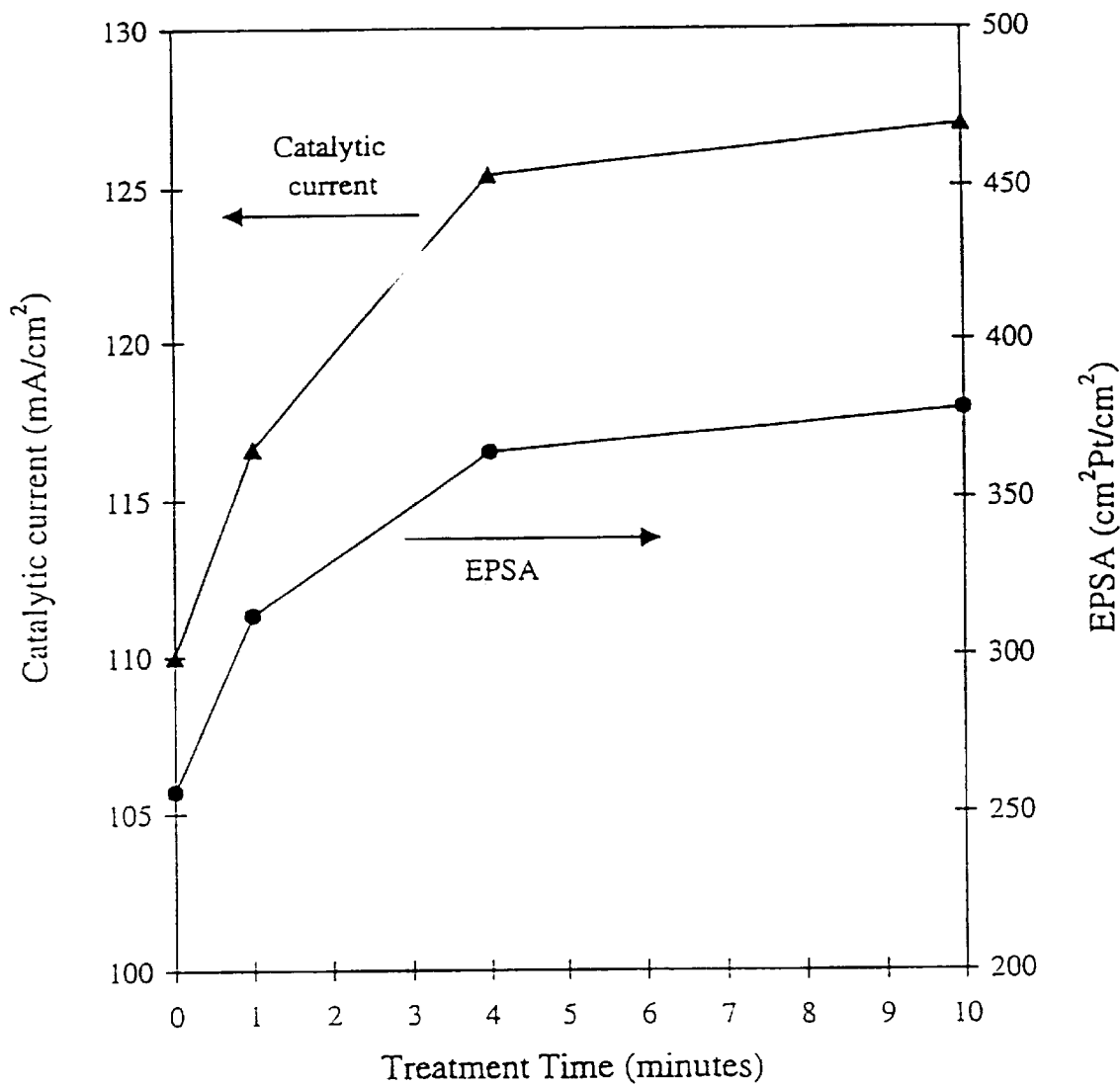
FIG. 2 is a plot of effective platinum surface area ("EPSA") and catalytic current as a function of treatment time, showing the EPSA and catalytic current data for the treated anodes and untreated anode of Example 1.

The effective platinum surface area ("EPSA") was determined for the three remaining test anodes and the anode incorporating the untreated substrate. The results are shown in FIG. 2. This measurement involves cyclic voltammetry adsorption/desorption of surface hydrogen on the anode at 24° C. and at a scan rate of 20 mV/s. The methanol oxidation catalytic current for each test anode was determined in a laboratory test cell. The test cell used the test anode as the working electrode, platinum as the counter electrode, and a saturated calomel electrode ("SCE") as a reference electrode. The liquid electrolyte in the test cell was 0.5 M $CH_3OH$ and 0.5 M $H_2SO_4$ at 85° C. Cyclic voltammetry sweeps from –0.3 V to 1 V versus S.C.E. were taken on each electrode and the results at 0.3 V vs. SCE. are shown in FIG. 2.

As shown in FIG. 2, a significant improvement in the rate of methanol oxidation (catalytic current) occurred as a result of treatment of the anode substrates. Longer treatment times gave additional improvement. An increase in EPSA is observed with the increase in catalytic current.

EXAMPLE 2

Another series of fuel cell anodes was prepared as in Example 1 except that different substrate materials were employed. Four different substrate materials were tested: a carbon fibre non-woven (CFNW) two grades of carbon fibre paper (CFP), TGP-090 and TGP-H-090 grades from Toray, and non-porous graphite plate. For each substrate type, an anode incorporating an untreated substrate was prepared for comparative purposes and a treated test anode was prepared as in Example 1 above. The electrochemical oxidation treatment time in each case was 10 minutes. As before, each test anode substrate was then washed.

As in Example 1, an aqueous catalyst ink was applied to the surface of each substrate and an ionomer coating was applied thereafter. Finally, the methanol oxidation catalytic current for each was determined in a laboratory test cell as above. The results at 0.3 V vs. SCE are shown in Table 1 below. In all cases, a significant improvement in the rate of methanol oxidation occurs as a result of treatment of the anode substrates. The improvement on the graphite substrate is particularly significant.

Although the areas of each test substrate were the same, the weights were not, thus the values for catalytic current in Table 1 are not normalized by weight. While the non-porous graphite plate was used to demonstrate an increased catalytic current, it is not suitable for use as an actual fuel cell electrode substrate since it is non-porous.

TABLE 1

Catalytic current for various treated substrate materials

| Substrate type | Catalytic current, untreated ($mA/cm^2$) | Catalytic current, treated ($mA/cm^2$) |
| --- | --- | --- |
| CFNW | 70 | 85 |
| TGP-090 | 110 | 127 |
| TGP-H-090 | 113 | 140 |
| Graphite | 150 | 392 |

EXAMPLE 3

Two 49 $cm^2$ pieces of TGP-090 substrate were used to construct anodes for experimental fuel cells. One piece was electrochemically oxidized for 5 minutes at a similar current density and voltage as in Example 2 above. The other piece was left untreated for comparative purposes. Otherwise, anode fabrication was completed as in Example 2.

Experimental fuel cells were then made to test performance in an actual fuel cell environment. MEAs were fabricated using a conventional cathode and the test anodes with a Nafion™ 117 membrane. Flow field plates were pressed against both cathode and anode. The fuel stream was liquid 0.5 M $CH_3OH$ and air was used as the oxidant. The fuel cells were operated with a fuel stream flow rate of about 11 mLpm and an air flow rate of about 0.49 mLpm at 100° C. The fuel and air stoichiometries were about 3.6 and 2 at 300 $mA/cm^2$ respectively. Reactant stoichiometry refers to the ratio of the amount of a reactant supplied to a fuel cell to the amount of the reactant consumed in the fuel cell. For example, an $H_2$ stoichiometry of 1.5 means that 2 parts of hydrogen are consumed in the fuel cell for every 3 parts of hydrogen supplied to the fuel cell.)

Figure 3:
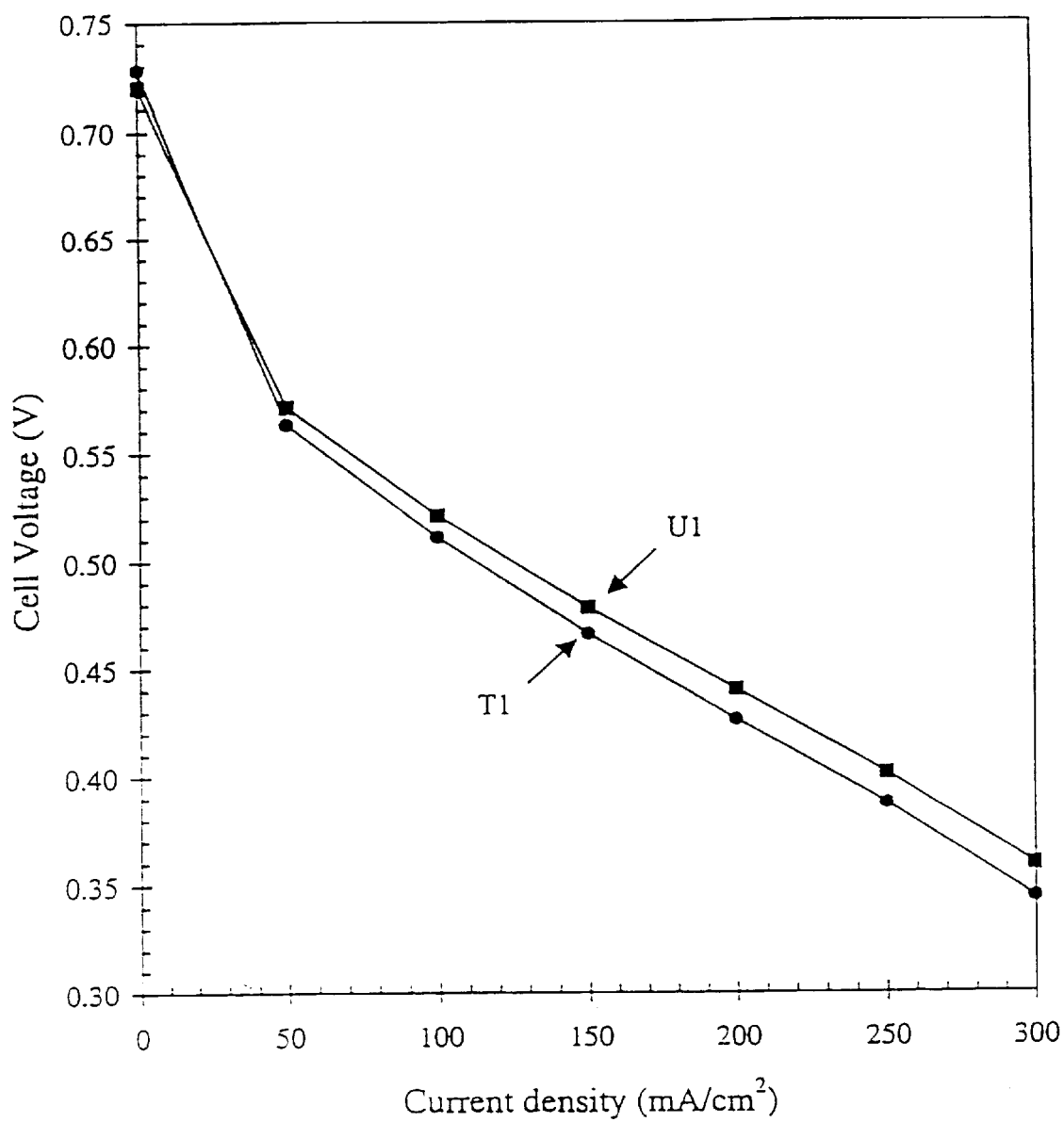
FIG. 3 is a polarization plot of cell voltage as a function of current density for fuel cells incorporating an oxidatively treated anode (plot T1) and untreated anode (plot U1) of Example 3, which had not been impregnated with ionomer before applying the catalyst.

Polarization plots of the fuel cell voltages as a function of current density using the oxidatively treated and untreated anodes, denoted T1 and U1, respectively, are shown in FIG. 3. Surprisingly, the fuel cell comprising the treated anode (plot T1) shows poorer performance characteristics than the comparative fuel cell that included the untreated anode (plot U1).

EXAMPLE 4

A series of test cells was constructed using treated anode substrates similar to the anodes prepared using a TGP-H-090 substrate as in Example 2, except that the test cells were of increasing complexity and scale, as described below. Test cells were also constructed using untreated anode substrates for comparative purposes. Here, however, experimental fuel cell anode substrates were impregnated with ionomer prior to application of the catalyst.

(a) Laboratory Test Cell

As shown in Table 1 above, the treated and untreated anodes made with TGP-H-090 substrates in Example 2 showed catalytic currents of 113 and 140 mA/cm$^2$ respectively. This represents almost a 15% improvement in methanol oxidation rate.

(b) Laboratory Half Fuel Cell

Two 5.7 cm$^2$ pieces of TGP-H-090 were used to construct anodes for a laboratory half fuel cell. One piece was electrochemically oxidized at a constant current of 3 A and a cell voltage of about 4 V for 10 minutes. The other piece was left untreated for comparative purposes. Again, anode fabrication was completed by washing with de-ionized water, applying Pt—Ru black aqueous ink, and finally coating with Nafion™ ionomer solution. These substrates were not impregnated with ionomer prior to application of the catalyst.

Laboratory half fuel cells were used to test methanol oxidation rate in a simulated fuel cell environment. The laboratory half fuel cell used a half membrane electrode assembly consisting of the anode laminated to Nafion™ 117 membrane. A flow field plate was pressed against the anode side of the half MEA and a liquid 0.5 M CH$_3$OH fuel stream was directed to the anode. A diffusion plate was pressed against the exposed membrane side (cathode side) of the half MEA. The diffusion plate opened onto a chamber containing 0.5 M H$_2$SO$_4$. The chamber also contained a platinum counter electrode and an SCE reference electrode located adjacent to the diffusion plate.

Figure 4:
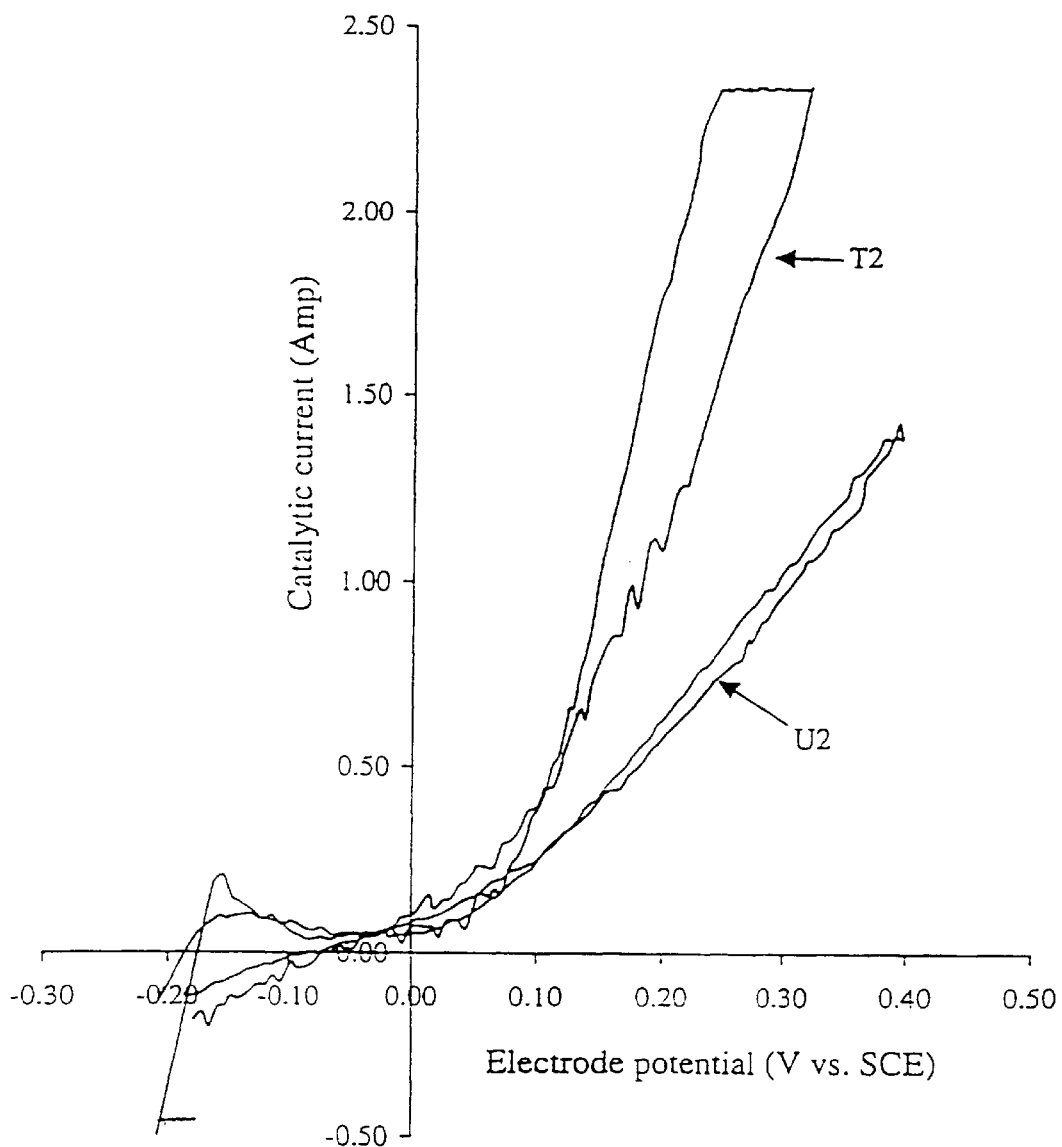
FIG. 4 is a plot of catalytic current as a function of electrode potential, showing the current versus voltage cyclic voltammetry data of laboratory half fuel cells incorporating an oxidatively treated anode (plot T2) and an untreated anode (plot U2) of Example 4(b).

Methanol oxidation catalytic current for each test anode was then determined by cyclic voltammetry sweeps at 50 mV/s with the test fuel cell at 75° C. The methanol flow rate was 6.5 mLpm. FIG. 4 shows the current versus voltage results of these sweeps. The treated anode, denoted in the plot as T2, performed substantially better than the untreated one, denoted in the plot as U2. Methanol crossover had no significant influence on the performance of this type of half fuel cell.

(c) Laboratory Fuel Cell

Four 5.7 cm$^2$ pieces of TGP-H-090 were used to construct anodes for a miniature complete test fuel cell. Two pieces were electrochemically oxidized as above at a constant current of 3 A and a cell voltage about 4 V for 10 minutes. The other two pieces were not treated electrochemically, for comparative purposes. Anode fabrication was completed as in the preceding Examples except that one treated and one comparative substrate were impregnated with ionomer prior to application of the catalyst. Ionomer impregnation was accomplished by coating the substrates with about 0.3 mg/cm$^2$ ionomer using a 1% solution of Nafion™ ionomer in isopropanol. The oxidatively treated substrate was impregnated after the electrochemical treatment but before the application of catalyst. The oxidatively treated and impregnated substrate was noticeably less wetted by the applied aqueous catalyst ink than the oxidatively treated substrate that had not been impregnated with Ionomer.

Small scale fuel cells using MEAs consisting of a conventional air cathode and a test anode with Nafion™ 117 membrane were used to test methanol oxidation rate in an actual fuel cell environment. Flow field plates were pressed against both cathode and anode and a liquid 0.5 M CH$_3$OH fuel stream and air oxidant were directed to each respectively. The fuel cells were operated with a fuel flow rate of about 14 mLpm and an air flow rate of about 0.23 mLpm at 95° C. The fuel and air stoichiometries were about 38 and 12.5 at 300 mA/cm$^2$ respectively.

Figure 5:
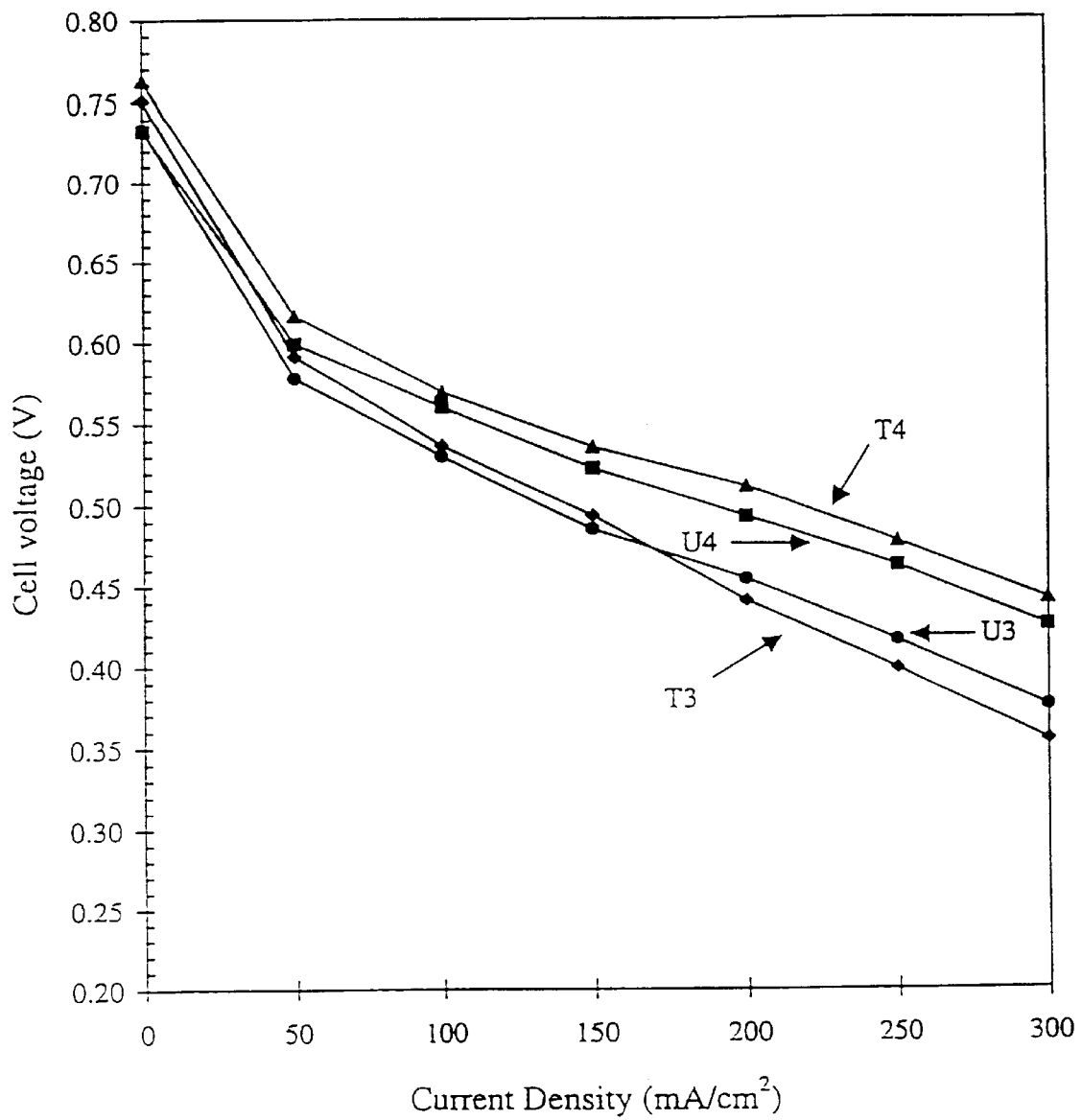
FIG. 5 is a polarization plot of cell voltage as a function of current density for laboratory fuel cells incorporating oxidatively treated anodes (plots T3 and T4) and untreated anodes (plot U3 and U4) of Example 4(c).

Polarization plots of the cell voltage as a function of current density using the four anodes are shown in FIG. 5.

In FIG. 5, the treated and untreated anodes that had not been impregnated with ionomer prior to catalyst application are denoted in the plots as T3 and U3, respectively. The treated and untreated anodes that had been impregnated with ionomer prior to catalyst application are denoted in the plots as T4 and U4 respectively. The fuel cell comprising the oxidatively treated anode substrate T3 shows disappointing performance, particularly at high current density, in relation to the comparative fuel cell comprising the untreated anode U3. However, the cell incorporating the impregnated, oxidatively treated anode substrate T4 showed a significant performance improvement over the cell incorporating the substrate which was not oxidatively treated but impregnated U4 at all current densities.

In combination with Example 3, Example 4 suggests that the benefits of electrochemically oxidizing the substrate is potentially offset by other factors such that there is no net improvement in all actual fuel cells. However, impregnating the oxidized substrate with ionomer prior to applying the catalyst has been found to improve net fuel cell performance as a result of the oxidative treatment. Further, a comparison of plots U4 and U3, suggests that impregnating untreated substrates without oxidative treatment results in an unexpected performance improvement.

(d) Larger Test Fuel Cell

Three 49 cm$^2$ pieces of TGP-H-090 were used to construct anodes for larger test fuel cells. Two pieces, denoted T5 and T6, were electrochemically oxidized as above at a constant current of 5 A at a cell voltage about 4 V for 10 minutes. The remaining piece, denoted U5, was left untreated for comparative purposes. All substrates were then impregnated with ionomer as in Example 4(c) above except that substrate in plot T6 was impregnated twice, resulting in a total Nafion™ coating of about 0.6 mg/cm$^2$ prior to application of the aqueous catalyst ink. Anode fabrication was then completed as in the preceding Examples.

Fuel cell construction was similar to that of Example 4(c) above except that the fuel cell was larger and Nafion™ 1135 membrane was used. The fuel stream was aqueous 0.4 M CH$_3$OH at a fuel stoichiometry of 3 and oxidant air was used at a stoichiometry of 2 at 110° C.

Figure 6:
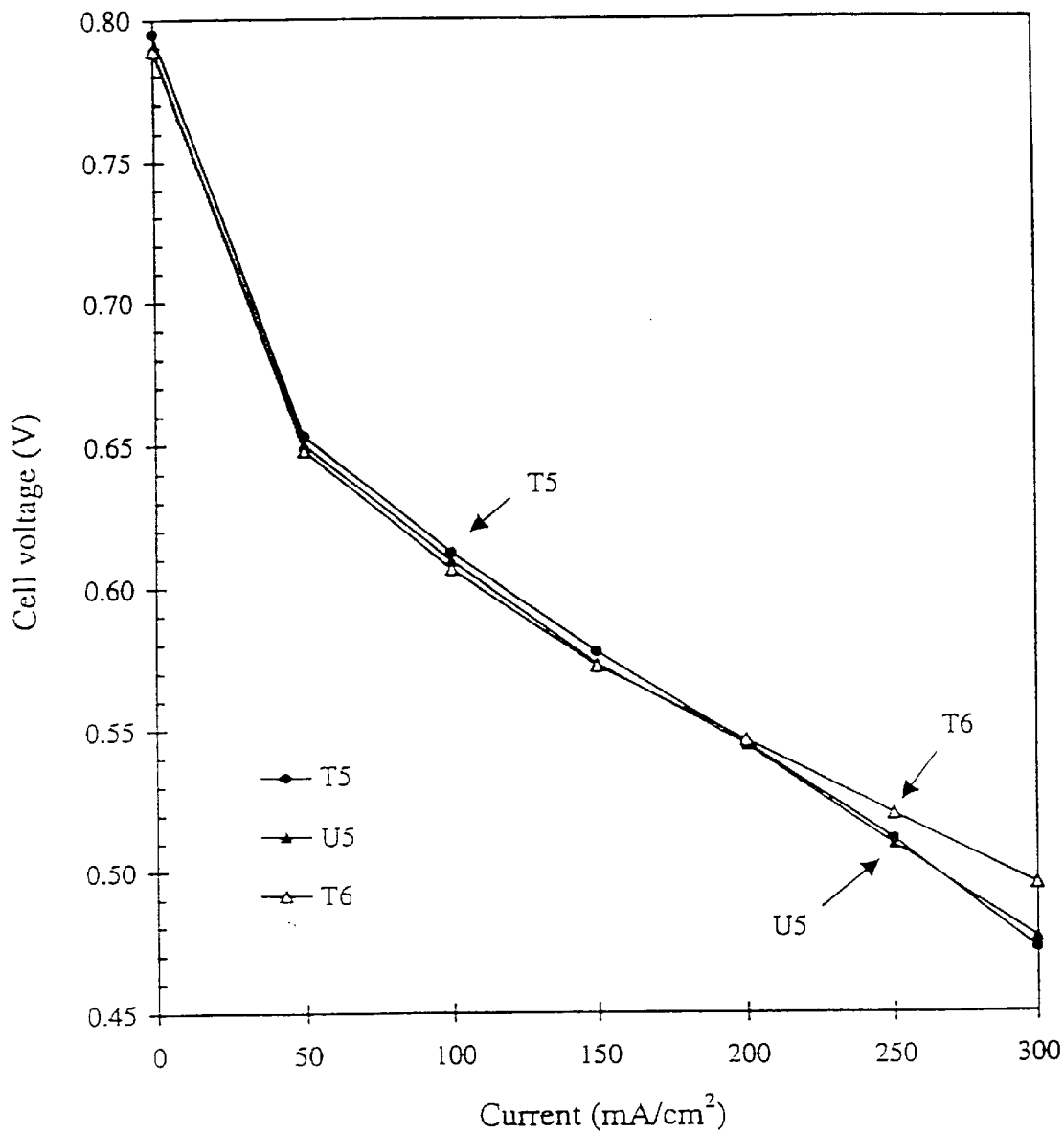
FIG. 6 is a polarization plot of cell voltage as a function of current density for fuel cells incorporating oxidatively treated anodes (plots T5 and T6) and untreated anode (plot U6) of Example 4(d).

Plots of the cell voltage versus current density using the three anodes are shown in FIG. 6. Here, a significant net improvement in performance over the comparative cell (plot U5) was observed at the highest current density for the doubly impregnated anode (plot T6). This improvement may result from the oxidative treatment or the extra impregnation. The net performance improvement with oxidative treatment and impregnation is not as great as that observed in Example 4(c). This may be a result of increased methanol crossover in these experiments since greater crossover would be expected with a Nafion™ 1135 membrane than a Nafion™ 117 membrane.

This series of test cell results shows that while oxidative treatment of electrode substrates improves the methanol oxidation rate in a half cell, the net improvement in certain fuel cell designs under certain operating conditions may not be as great as expected from catalytic current test cell results alone. The improvement may be offset by other factors, including the effect the treatment has on catalyst application, methanol crossover, and the like.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

What is claimed is:

1. A method of improving fuel cell performance in a liquid feed solid polymer electrolyte fuel cell comprising at least one electrode, said electrode comprising a carbonaceous substrate and an electrocatalyst, said method comprising oxidizing said carbonaceous substrate prior to incorporation of said electrocatalyst into said electrode.

2. The method of claim 1 wherein the oxidation of said carbonaceous substrate is performed electrochemically in an aqueous solution.

3. The method of claim 2 wherein said aqueous solution is acidic.

4. The method of claim 3 wherein said oxidation comprises:

immersing said carbonaceous substrate and a counter electrode in said acidic aqueous solution;

connecting said carbonaceous substrate and said counter electrode to the positive and negative terminals of a power supply, respectively, thereby forming an electrochemical cell; and directing electric current through the electrochemical cell.

5. The method of claim 4 wherein said electrochemical oxidative treatment comprises directing greater than about 20 coulombs per $cm^2$ of the carbonaceous substrate.

6. The method of claim 4 wherein the voltage of said carbonaceous substrate in said electrochemical cell is greater than 1.2 V versus a Normal Hydrogen Electrode.

7. The method of claim 3 wherein said acidic aqueous solution comprises sulfuric acid.

8. The method of claim 7 wherein said acidic aqueous solution is approximately 0.5 M $H_2SO_4$.

9. An electrode for a liquid feed solid polymer electrolyte fuel cell made according to the method of claim 2.

10. An anode for a liquid feed solid polymer electrolyte fuel cell made according to the method of claim 2.

11. The method of claim 1 further comprising impregnating said treated carbonaceous substrate with a proton conducting ionomer prior to incorporation of said electrocatalyst into said electrode.

12. The method of claim 11 wherein said proton conducting ionomer is a poly(perfluorosulphonic acid).

13. The method of claim 12 wherein said treated carbonaceous substrate is impregnated to produce an ionomer loading of greater than about 0.2 $mg/cm^2$ of said poly (perfluorosulphonic acid).

14. The method of claim 11 further comprising subsequently applying said electrocatalyst to said treated impregnated carbonaceous substrate.

15. The method of claim 14 wherein said electrocatalyst is applied to said treated impregnated carbonaceous substrate in an aqueous ink.

16. The method of claim 15 wherein said electrocatalyst is a platinum-ruthenium alloy.

17. The method of claim 1 wherein said liquid feed solid polymer electrolyte fuel cell is a direct methanol fuel cell.

18. The method of claim 1 wherein said carbonaceous substrate comprises carbon fibre paper.

19. The method of claim 1 wherein said carbonaceous substrate comprises carbon fibre non-woven.

20. An electrode for a liquid feed solid polymer electrolyte fuel cell made according to the method of claim 1.

21. An anode for a liquid feed solid polymer electrolyte fuel cell made according to the method of claim 1.

22. A liquid feed solid polymer electrolyte fuel cell comprising:

an electrode comprising a carbonaceous substrate and an electrocatalyst, wherein said carbonaceous substrate has been oxidized prior to incorporation of said electrocatalyst into said electrode.

23. The liquid feed solid polymer electrolyte fuel cell of claim 22 wherein the oxidation has been performed electrochemically in an aqueous solution.

24. The liquid feed solid polymer electrolyte fuel cell of claim 23 wherein said aqueous solution is acidic.

25. A method of improving fuel cell performance in a liquid feed solid polymer electrolyte fuel cell having an electrode, said electrode comprising a substrate and an electrocatalyst, said method comprising:

impregnating said substrate with a proton conducting ionomer; and applying said electrocatalyst to said substrate.

* * * * *